S. J. WILSON.
BEET HARVESTING AND TOPPING MACHINE.
APPLICATION FILED JAN. 16, 1917.

1,285,529.

Patented Nov. 19, 1918.
4 SHEETS—SHEET 1.

Inventor
SAMUEL J. WILSON
By Watson E. Coleman
Attorney

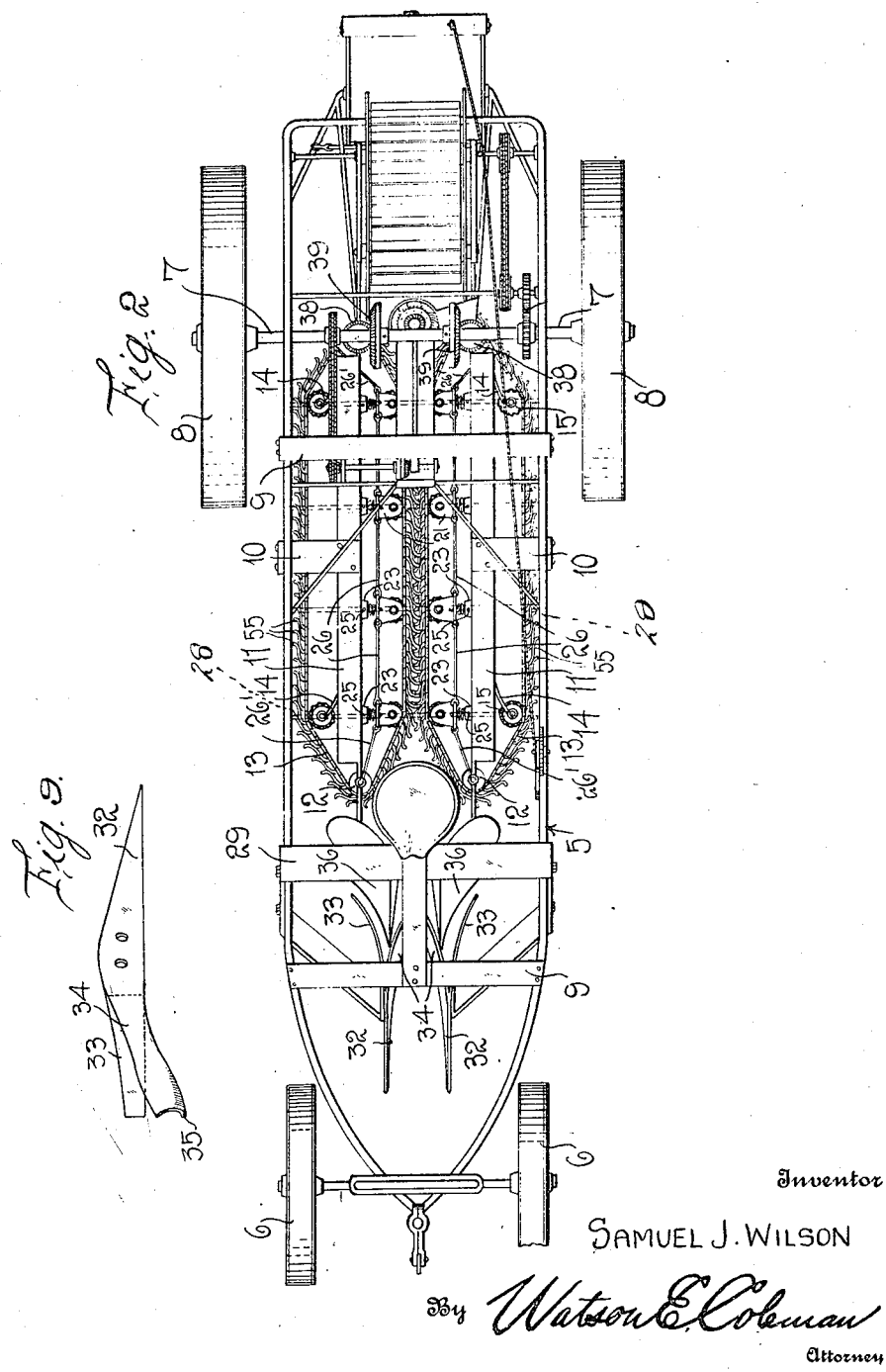

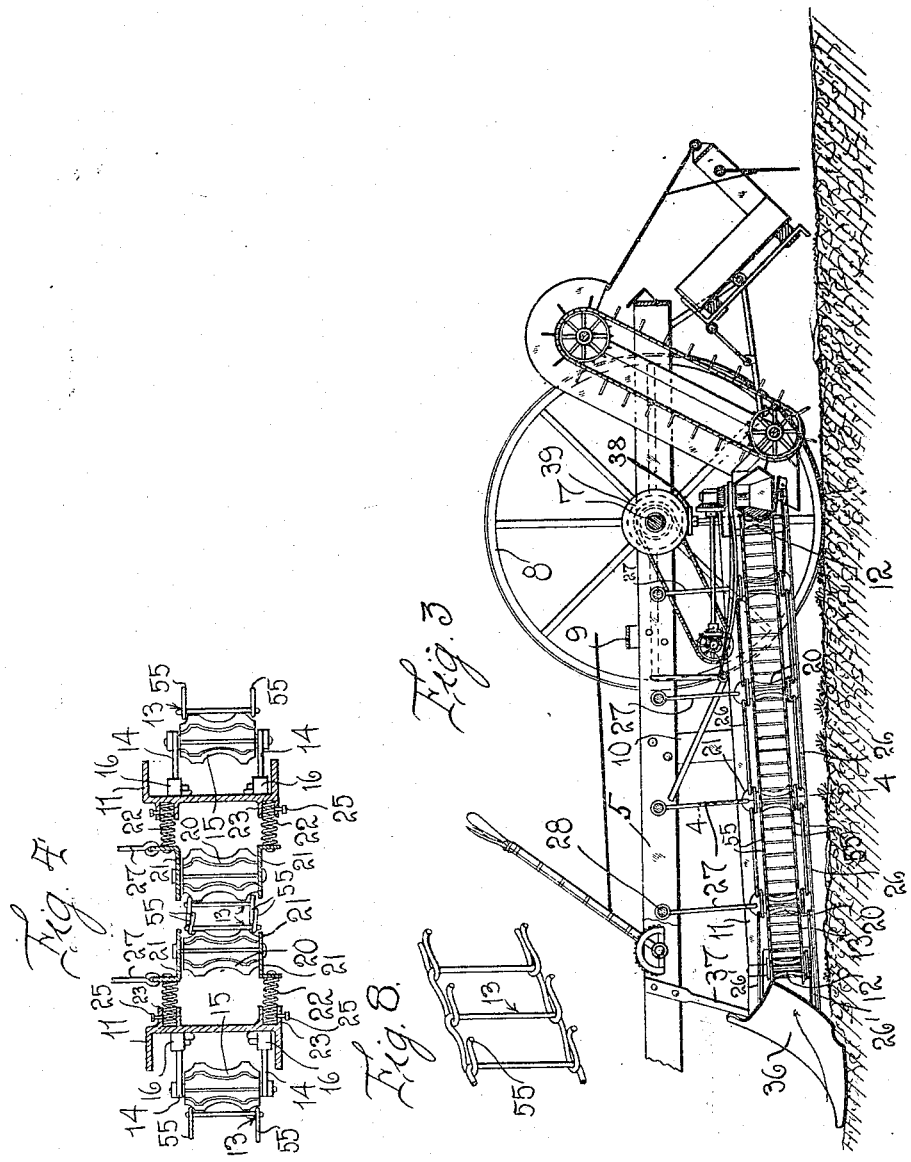

S. J. WILSON.
BEET HARVESTING AND TOPPING MACHINE.
APPLICATION FILED JAN. 16, 1917.
1,285,529.
Patented Nov. 19, 1918.
4 SHEETS—SHEET 4.
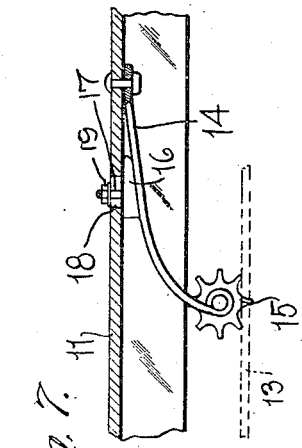
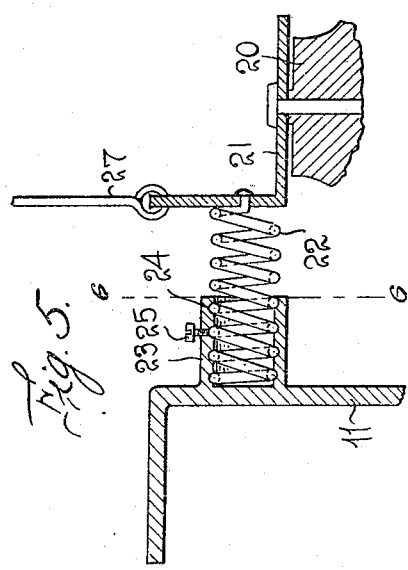
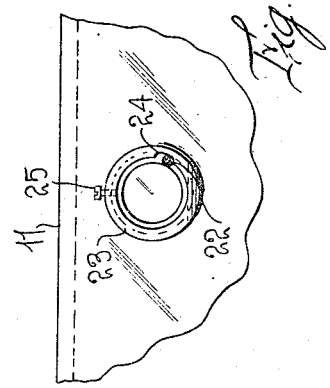
Inventor
SAMUEL J. WILSON
By Watson E. Coleman
Attorney

UNITED STATES PATENT OFFICE.

SAMUEL J. WILSON, OF ROBERTS, IDAHO, ASSIGNOR OF ONE-HALF TO PERRY BASINGER, OF CLYDE, IDAHO.

BEET HARVESTING AND TOPPING MACHINE.

1,285,529. Specification of Letters Patent. Patented Nov. 19, 1918.

Application filed January 16, 1917. Serial No. 142,679.

*To all whom it may concern:*

Be it known that I, SAMUEL J. WILSON, a citizen of the United States, residing at Roberts, in the county of Jefferson and State of Idaho, have invented certain new and useful Improvements in Beet Harvesting and Topping Machines, of which the following is a specification, reference being had to the accompanying drawings.

This invention relates to an improved beet harvesting machine and has for its primary object to provide simple and effective means for positively carrying or conveying the beets after they have been extruded from the ground to a suitable topping mechanism.

It is a more particular object of my invention to provide a machine of the above character having a pair of longitudinally extending conveyer chains operating in a vertical plane, means for yieldingly urging the opposed stretches of the chains toward each other, the chain links having means to engage the beets and maintain the same in an upright position as they are carried by the chains to the topping mechanism.

It is also a further general object of my invention to improve and simplify the construction of beet harvesting machines whereby the same is rendered highly efficient and reliable in its operation, strong and durable in construction, and capable of manufacture at relatively small cost.

With the above and other objects in view, my invention consists in the novel features of construction, combination and arrangement of parts to be hereinafter more fully described, claimed and illustrated in the accompanying drawings, in which, Figure 1 is a side elevation of a beet harvesting and topping machine constructed in accordance with the preferred embodiment of the invention;

Fig. 2 is a top plan view;

Fig. 3 is a longitudinal section;

Fig. 4 is a transverse section taken on the line 4—4 of Fig. 3;

Fig. 5 is an enlarged detail section illustrating the means for adjusting the roller springs of the conveyer chains;

Fig. 6 is a section taken on the line 6—6 of Fig. 5;

Fig. 7 is a detail horizontal section illustrating the mounting of one of the chain tensioning rollers;

Fig. 8 is a detail perspective view of a portion of one of the conveyer chains; and Fig. 9 is a side elevation of one of the beet diggers.

Figure 1:
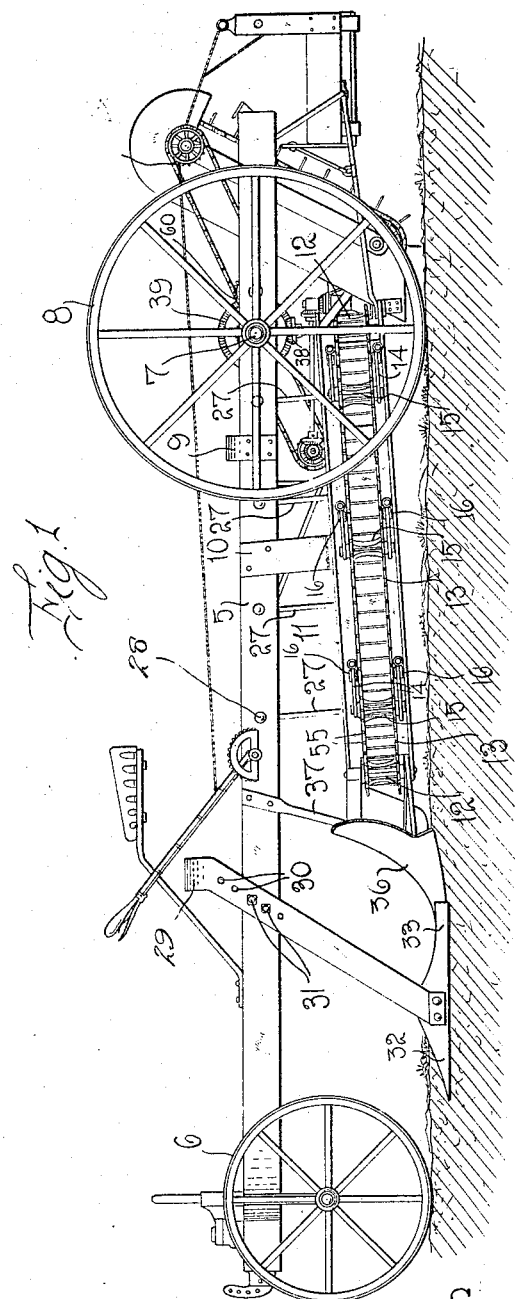

Referring in detail to the drawings, 5 designates an elongated frame of substantially rectangular form, the side bars of which are convergently disposed and connected to each other at the forward end of the frame. Upon this forward end of the frame, the casters or guide wheels 6 are suitably mounted. The wheel axle 7 is suitably journaled in the frame 5 adjacent its rear end, and upon opposite ends of said wheel axle the ground wheels 8 are fixed. The side bars of the frame 5 are connected at spaced points by means of the transverse bars 9.

To the lower ends of angularly disposed hanger bars 10 which are fixed at their upper ends to the side bars of the frame 5, the parallel, longitudinally extending, channel bars 11 are secured. These channel bars constitute a subframe which extends longitudinally below the main frame 5 of the machine relatively close to the ground surface. Upon the opposite ends of each channel bar 11, a vertically disposed roller 12 is mounted, and around these rollers the conveyer chains 13 are engaged. Upon the outer side of each of the channel bars 11, spaced pairs of spring arms 14 are secured at one of their ends, the other ends of said arms being outwardly curved and having suitable terminal bearings to receive the trunnions on the ends of the tensioning rollers 15 which bear against the inner sides of the outer stretches of the respective chains 13. A wedge block 16 is engaged between each of the arms 14 and the face of the bar 11 and carries a threaded bolt 17 movable in a slot 18 in the frame bar. By means of a nut 19 threaded on said bolt, the wedge block may be tightly clamped in its adjusted position. It will be readily understood that by shifting the wedge block 16 toward or from the fixed ends of the arms 14, the outward pressure of the rollers 15 upon the conveyer chains may be varied accordingly.

The inner opposed stretches of the chains 13 are normally urged toward each other by the rollers 20. Each of these rollers is mounted in a pair of angular bracket members 21, in each of which one end of a coil spring 22 is loosely engaged to rotate. The coils at the other ends of these springs are disposed in a spiral groove 24 formed in the wall of a tubular boss 23 projecting inwardly from the bar 11. It will be understood that by turning the springs 22, they may be threaded inwardly or outwardly in the bosses 23, and the pressure of the rollers 20 on the chain stretches varied as desired. The springs 22 are secured in their adjusted positions in the bosses 23 by means of suitable set screws 25. The series of brackets 21 which are thus mounted upon the respective bars 11, are connected to each other by the link rods 26 and suspended by means of the vertical rods 27 from the spaced, transverse rods 28 which are fixed at their ends in the longitudinal bars of the frame 5. The bracket members 21 at the forward ends of the conveyer chains, are also connected to the ends of the bars 11 by the link rods 26'.

A yoke bar 29 straddles the frame 5 in advance of the conveyer chains 13, the downwardly extending arms of this yoke bar being obliquely disposed and each provided with a series of openings 30 to receive bolts 31 in the side bars of the frame 5, whereby the yoke may be vertically adjusted with respect to said frame. The arms of the yoke bar 29 converge inwardly toward each other, and upon their lower ends the digging blades 32 are secured. Each of these blades, at its rear end, is outwardly curved as at 33, and is provided with an inwardly curved wing 34. The extremities of the wings 34 on the digging blades are disposed contiguous to each other and the lower edges of these wings are outwardly turned, as at 35, (see Fig. 13). Directing plows or shovels 36 are mounted upon the lower ends of the inwardly converging hanger rods 37 which are fixed to the opposite sides of the frame 5. These plows direct the uprooted beets between the forward ends of the chains 13 and also serve to throw the loose soil or dirt outwardly at each side of the furrow so that it will not be caught between the conveyer chains and clog their operation.

The shaft or axis of each of the rear conveyer supporting rollers 12 is vertically extended, and upon the same a bevel pinion 38 is fixed. With these pinions, the bevel gears 39 on the wheel axle 7 are in mesh, whereby the conveyers will be constantly driven during the operation of the machine.

In the operation of the machine it will be understood that in the travel of the machine, the blades 32 enter beneath the soil at opposite sides of the beets and uproot the same, the wings 34 lifting the beets above the surface of the ground and between the directing plows 36 by which they are directed into the space between the forward ends of the chains 13. Each of the chains consists of a series of wire links, the terminals of which are outwardly projected, as at 55. These link terminals on the inner opposed stretches of the chains engage above and below the beets which enter between the chain stretches and effectively hold the beets against vertical movement in either direction as they are carried rearwardly.

As the specific beet topping mechanism constitutes no part of the present invention, it is not herein described in detail, as it will be apparent that the improved beet conveying means above described may be employed in connection with any improved topping mechanism now known in the art.

From the foregoing description, taken in connection with the accompanying drawings, the construction, manner of operation and several advantages of the machine will be clearly and fully understood. The relative arrangement of the several parts provides a very compact mechanism which is not liable to get out of order and which will operate efficiently to harvest the beets. The manner of mounting and arranging the conveyers may be modified in many respects from that above described, and the several other coöperating parts of the mechanism can also be changed in minor details. It will, therefore, be understood that I reserve the privilege of adopting all such legitimate alterations in the form, proportion and arrangement of the several elements employed as may be fairly embodied within the spirit and scope of the invention as claimed.

Having thus fully described my invention, what I desire to claim and secure by Letters Patent is:

1. In a beet harvesting machine, opposed endless conveyers, flexibly connected series of rollers engaged against the inner sides of the opposed stretches of the conveyers, and means yieldingly urging the respective series of rollers in one direction to engage the conveyer stretches with the beets.

2. In a beet harvesting machine, opposed endless conveyers, a series of flexibly connected rollers engaged against the opposed stretches of the conveyers, a spring co-acting with each of the rollers to urge the same toward the conveyer and yieldingly retain the opposed stretches of the conveyers in engagement with the beets, and means urging the other stretch of each conveyer in a relatively opposite direction.

3. In a beet harvesting machine, a main wheel supported frame, a subframe below the main frame, opposed endless beet conveyers, roller bearings, rods connected to said bearings and suspended from the main frame, there being a series of bearings for each conveyer chain, means flexibly connecting the bearings in each series to each other, rollers mounted in said bearings and engaging the conveyer chains, and tensioning means mounted upon the subframe and coacting with the roller bearings.

4. In a beet harvesting machine, spaced longitudinally disposed bars, rollers mounted upon the opposite ends of each bar, an endless conveyer extending around said rollers, a series of flexibly connected rollers coacting with the opposed stretches of the chains, springs interposed between said bars and the rollers to urge the same in one direction and hold the chain stretches yieldingly in engagement with the beets, additional rollers mounted upon the relatively opposite sides of said bars to support the other stretches of the chains in parallel relation to the bars, and means yieldingly urging the latter rollers outwardly to tension the conveyer chains.

In testimony whereof I hereunto affix my signature in the presence of two witnesses.

SAMUEL J. WILSON.

Witnesses:
M. C. LYDDANE,
M. R. WILSON.

Copies of this patent may be obtained for five cents each, by addressing the "Commissioner of Patents, Washington, D. C."